Jan. 4, 1927.
A. MESSER
1,613,184
ACETYLENE GENERATOR
Filed August 29, 1921
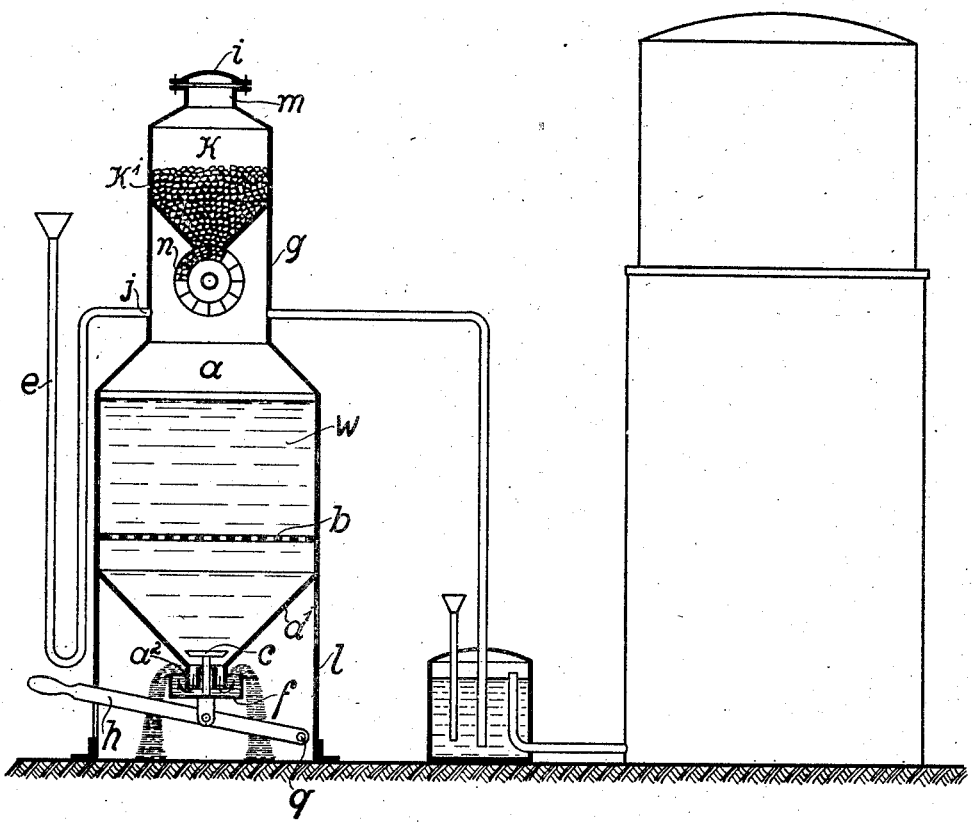

Patented Jan. 4, 1927.

1,613,184

UNITED STATES PATENT OFFICE.

ADOLF MESSER, OF FRANKFORT-ON-THE-MAIN, GERMANY.

ACETYLENE GENERATOR.

Application filed August 29, 1921, Serial No. 496,762, and in Germany February 6, 1914.

(GRANTED UNDER THE PROVISIONS OF THE ACT OF MARCH 3, 1921, 41 STAT. L., 1313.)

The novelty of the acetylene generator, protected by water seal against inflow of air, consists in the construction of the water seal as a device for the removal of sediments. A U-shaped tubular water inlet which is preferably used in connection with the generator terminates above the level of the liquid and contains a column of liquid which is of sufficient height to serve as a seal against the inflow of air or gas.

The danger of clogging is thus reduced, the removal of cloggings which should nevertheless have been formed is facilitated and the inflow of air into the generator during the removing of the sediment is absolutely prevented.

In order that the invention may be clearly understood, I shall proceed to describe the same with reference to the form of construction of the improved acetylene generator shown in longitudinal section in the only figure of the drawing.

The generator $a$ has a top $g$ with carbide container $k$. The feed hopper $m$ of this container through which the carbide is charged has a lid $i$. Under the funnel-shaped bottom plate $k'$ of the carbide container a feed drum $n$ is revolubly mounted which is divided into a number of compartments. The body $a$ of the generator contains a grate $b$ upon which the sediments collect and further the water designed to produce the acetylene from the carbide thrown into the water from the drum $n$. The bottom $a'$ of the body $a$ of the generator is conical and has a valve $c$ in the outflow $a^2$.

The tubular outflow $a^2$ of the body $a$ dips into a cup $f$ which is filled with water, said cup being supported by a hand lever $h$ pivotally mounted at $q$ in the front part of body $a$. Said cup $f$ supports the valve $c$. A U-shaped tube $e$ which terminates at $j$ in the top $g$ of the generator above the water level $w$ in the body $a$ serves for filling generating water into the said body $a$ so that the same contains a column of water preventing the inflow of the air and the gas when the valve $c$ is opened.

If, for the purpose of removing the sediment, the valve $c$ and at the same time the cup $f$ are raised such a quantity of sediment flows out of the generator $a$ that a vacuum is formed in said generator which corresponds to the column, no outer air being able to flow in because the cup $f$ filled with water forms a water seal. If now fresh water is let in through the supply tube $e$, a quantity of carbide sediment equal to the quantity of water admitted flows out through the valve $c$.

I claim:

An acetylene generator comprising in combination a carbide container, a body for the generating water having an outflow opening in its body, a tubular outflow in the opening, a water cup surrounding the tubular outflow and arranged for raising and lowering, a valve in said tubular outflow supported by said cup and means for lowering and raising said movable cup.

In testimony whereof I affix my signature.

ADOLF MESSER.